(12) United States Patent
Lee et al.

(10) Patent No.: US 9,161,381 B2
(45) Date of Patent: Oct. 13, 2015

(54) COMMUNICATION METHOD IN A MOBILE COMMUNICATION SYSTEM USING MTC EQUIPMENT, AND DEVICE FOR SAME

(75) Inventors: Jae Wook Lee, Anyang-si (KR); Sung Jun Park, Anyang-si (KR); Sung Hoon Jung, Anyang-si (KR); Young Dae Lee, Anyang-si (KR); Seung June Yi, Anyang-si (KR)

(73) Assignee: LG Electronics Inc., Seoul (KR)

( * ) Notice: Subject to any disclaimer, the term of this patent is extended or adjusted under 35 U.S.C. 154(b) by 523 days.

(21) Appl. No.: 13/521,129

(22) PCT Filed: Jan. 13, 2011

(86) PCT No.: PCT/KR2011/000234
§ 371 (c)(1),
(2), (4) Date: Jul. 9, 2012

(87) PCT Pub. No.: WO2011/087288
PCT Pub. Date: Jul. 21, 2011

(65) Prior Publication Data
US 2013/0010768 A1    Jan. 10, 2013

Related U.S. Application Data

(60) Provisional application No. 61/294,815, filed on Jan. 13, 2010.

(51) Int. Cl.
*H04W 76/04* (2009.01)

(52) U.S. Cl.
CPC .................................. *H04W 76/046* (2013.01)

(58) Field of Classification Search
CPC ... H04B 7/2653; H04B 7/2659; H04B 7/2643
See application file for complete search history.

(56) References Cited

U.S. PATENT DOCUMENTS

| 5,123,029 A * | 6/1992 | Bantz et al. ................... 375/133 |
| 2003/0211846 A1 * | 11/2003 | Nagpal et al. ................. 455/434 |

(Continued)

FOREIGN PATENT DOCUMENTS

| CN | 1416624 A | 5/2003 |
| CN | 1867166 A | 11/2006 |

(Continued)

OTHER PUBLICATIONS

3GPP TS 22.368 V1.1.1, "3rd Generation Partnership Project; Technical Specification Group Services and System Aspects; Service requirements for machine-type communications; Stage 1 (Release 10)", Nov. 2009.*

(Continued)

*Primary Examiner* — Huy D Vu
*Assistant Examiner* — James P Duffy
(74) *Attorney, Agent, or Firm* — Morgan, Lewis & Bockius LLP

(57) ABSTRACT

The present invention relates to a method for enabling the efficient communication of machine-type communication (MTC) equipment by selecting a connection with a base station during a first allowed time period in a mobile communication system using the MTC equipment, and to a device for same. With regard to an example of the present invention, a communication method for MTC equipment in a wireless mobile communication system may include: receiving a first message, including information regarding the first allowed time period, from a network through dedicated signaling; transmitting or receiving data to/from the network during the first allowed time period included in the first message; and receiving, from the network, a second message including information regarding a second allowed time period different from the first allowed time period.

20 Claims, 12 Drawing Sheets

(56) References Cited

U.S. PATENT DOCUMENTS

| | | | |
|---|---|---|---|
| 2004/0030792 A1 | 2/2004 | Febvre | |
| 2006/0252450 A1 | 11/2006 | Wigard et al. | |
| 2008/0280631 A1* | 11/2008 | Lee et al. | 455/458 |
| 2010/0246499 A1* | 9/2010 | Kim et al. | 370/329 |

FOREIGN PATENT DOCUMENTS

| | | |
|---|---|---|
| CN | 1925672 A | 3/2007 |
| CN | 101194438 A | 6/2008 |

OTHER PUBLICATIONS

First Notification of Office Action dated Apr. 30, 2014 from The State Intellectual Property Office of China in counterpart Chinese application No. 201180006095.2.
3GPP TS 22.368 V1.1.1, 3rd Generation Partnership Project; Technical Specification Group Services and System Aspects; Service requirements for machine-type communications; Stage 1(Release 10), Nov. 2009.
3GPP TS 23.888 V0.1.0, 3rd Generation Partnership Project; Technical Specification Group Service and System Aspects; Service Improvements for machine-type communications (Release 10), Dec. 2009.
3GPP TS 22.868 V8.0.0, 3rd Generation Partnership Project; Technical Specification Group Partnership Project; Technical Specification Group Services and System Aspects; Study on Facilitating Machine to Machine Communication in 3GPP Systems; (Release 10), Mar. 2007.
Fujitsu, "RNA Impacts of machine-type communications for UTRA and EUTRA", 3GPP TSG RAN WG2 Meeting #68bis, R2-100412, Jan. 18-22, 2010.
International Search Report and Written Opinion issued in corresponding International Application No. PCT/KR2011/000234 dated Sep. 27, 2011.

* cited by examiner

COMMUNICATION METHOD IN A MOBILE COMMUNICATION SYSTEM USING MTC EQUIPMENT, AND DEVICE FOR SAME

This is a U.S. National Phase Entry of PCT Application No. PCT/KR2011/000234, filed Jan. 13, 2011, and claims the benefit of U.S. Provisional Application No. 61/294,815 filed Jan. 13, 2010.

TECHNICAL FIELD

The present invention relates to a method for enabling the efficient communication of machine type communication (MTC) equipment by selecting a connection with a base station during a first allowed time period in a mobile communication system using the MTC equipment, and to a device for the same.

BACKGROUND ART

Machine type communication (MTC) equipment refers to a user equipment that performs communication between machines without manipulation of a user. Services provided through the MTC equipment are different from the existing communication services dependent upon manipulation of a user and may be applied to various categories.

In this case, a plurality of MTC equipments may be used together to provide various services. If a plurality of MTC equipments are together operated within one cell, problems may occur.

In other words, if a plurality of MTC equipments tries connection with a base station at the same time, load occurs in a radio interval, whereby communication of the respective MTC equipments may be interrupted.

Also, if a user equipment which is previously connected with a cell collides with the plurality of MTC equipments for the radio interval, data communication of the user equipment may be interrupted. In this respect, solutions for the problems will be required.

DISCLOSURE

Technical Problem

An object of the present invention devised to solve the aforementioned problems is to provide a method for enabling the efficient communication of machine type communication (MTC) equipment by selecting a connection with a base station during a first allowed time period in a mobile communication system using the MTC equipment, and to a device for the same.

Technical Solution

To solve the aforementioned technical problems, according to one aspect of the present invention, a communication method for a machine type communication (MTC) equipment in a wireless mobile communication system comprises the steps of receiving a first message, including information on the first allowed time period, from a network through dedicated signaling; transmitting or receiving data to or from the network during the first allowed time period included in the first message; and receiving, from the network, a second message including information on a second allowed time period different from the first allowed time period.

At this time, the method may further comprise the step of releasing connection with the network if the first allowed time period ends, and maintaining the released connection state until a start point of the second allowed time period.

Also, the method may further comprise the step of releasing connection with the network if the first message is received and maintaining the released connection state until a start point of the first allowed time period in a state that the MTC equipment is previously connected with the network before receiving the first message.

The first message may be a radio resource control (RRC) connection release message.

The second message may be received through a dedicated signal.

Also, the second message may be received through a common signal and the common signal may further include group ID.

Advantageous Effects

According to the embodiments of the present invention as described above, the efficient communication of the machine type communication (MTC) equipment may be performed by establishing connection with the base station during a first allowed time period in a mobile communication system that uses the MTC equipment, and the MTC equipment may perform communication by further acquiring next allowed time period for connection with the base station, whereby load may be prevented from occurring in a radio interval.

BEST MODE FOR CARRYING OUT THE INVENTION

Hereinafter, the preferred embodiments of the present invention will be described with reference to the accompanying drawings. It is to be understood that the detailed description, which will be disclosed along with the accompanying drawings, is intended to describe the exemplary embodiments of the present invention, and is not intended to describe a unique embodiment with which the present invention can be carried out. For example, although the following description will be made based on a mobile communication system of a 3GPP2 802.16 system, the following description may be applied to a method for performing efficient measurement in transmission of a user equipment in various mobile communication systems to which the carrier aggregation technology may be applied to, such as IEEE 802.16 based system.

Meanwhile, the following detailed description includes detailed matters to provide full understanding of the present invention. However, it will be apparent to those skilled in the art that the present invention can be carried out without the detailed matters. Also, in some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

Hereinafter, a method for performing channel quality measurement power-efficiently in a user equipment of a mobile communication system to which the carrier aggregation technology is applied, and the user equipment for the method will be described. First of all, a 3GPP LTE system which is an example of a mobile communication system for application of this technology will be described in brief.

Figure 1:
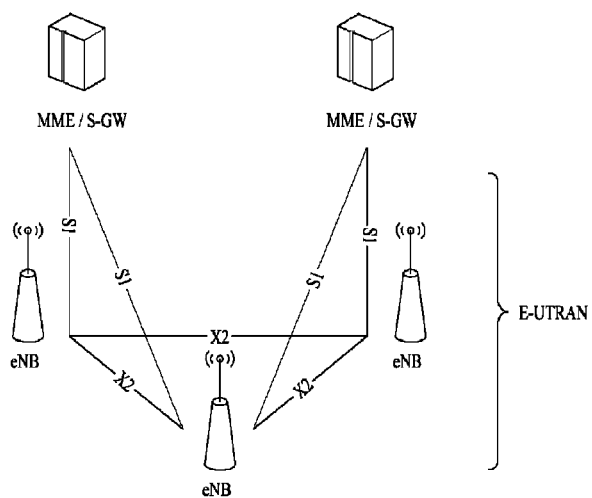
FIG. 1 is a diagram illustrating a network structure of an Evolved Universal Mobile Telecommunications System (E-UMTS) which is an example of a mobile communication system.

FIG. 1 is a diagram illustrating a network structure of an evolved universal terrestrial radio access network (E-UTRAN) which is an example of a mobile communication system. The E-UTRAN system is a system evolving from the conventional UTRAN system and its basic standardization is in progress in the current 3GPP. The E-UTRAN system may be referred to as a long term evolution (LTE) system.

The E-UTRAN includes eNBs (e-NodeB, or base station), wherein the respective eNBs are connected with each other through an interface X2. Also, each of the eNBs is connected with a user equipment (UE) through a radio interface and connected with an evolved packet core (EPC) through an interface S1.

The EPC includes a mobility management entity (MME), a serving-gateway (S-GW), and a packet data network-gateway (PDN-GW). The MME includes access information of the user equipment or ability information of the user equipment, wherein the access information or the ability information is mainly used for mobility management of the user equipment. The S-GW is a gateway having the E-UTRAN as an end point, and the PDN-GW is a gateway having a packet data network (PDN) as an end point.

Layers of a radio interface protocol between the user equipment and a network may be classified into a first layer L1, a second layer L2 and a third layer L3 on the basis of three lower layers of OSI (open system interconnection) standard model widely known in communication systems. A physical layer belongs to the first layer L1 and provides an information transfer service using a physical channel. A radio resource control (RRC) layer belongs to the third layer and provides control radio resources between the user equipment and the network. To this end, the RRC layer enables the user equipment and the network to exchange RRC message with each other.

Figure 2:
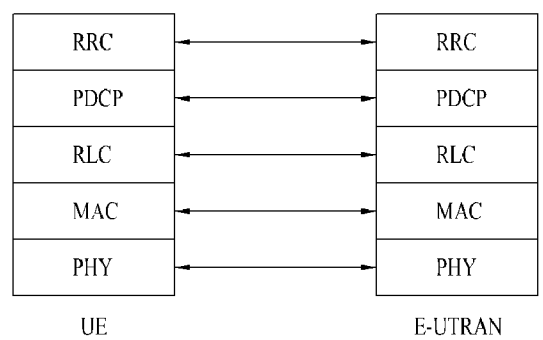
FIG. 2 and FIG. 3 are diagrams illustrating structures of radio interface protocols between a user equipment and E-UTRAN based on the 3GPP radio access network standard.
Figure 3:
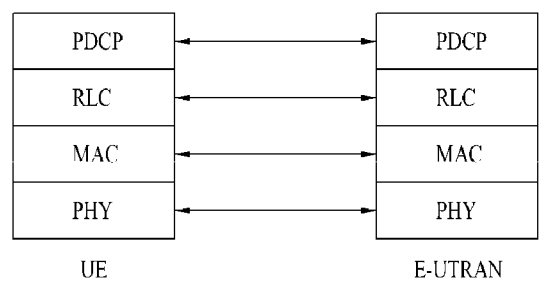

FIG. 2 and FIG. 3 are diagrams illustrating structures of radio interface protocols between a user equipment (UE) and E-UTRAN based on the 3GPP radio access network standard.

The radio interface protocol horizontally includes a physical layer, a data link layer, and a network layer, and vertically includes a user plane (U-plane) for data information transfer and a control plane (C-plane) for control signal transfer (signaling transfer). The protocol layers in FIGS. 2 and 3 may be classified into L1 (first layer), L2 (second layer), and L3 (third layer) based on three lower layers of the open system interconnection (OSI) standard model widely known in the communications systems. These radio protocol layers exist in the user equipment and the E-UTRAN in pairs, and play a role in data transfer of a radio interval.

Hereinafter, the respective layers of the radio protocol control plane of FIG. 2 and the radio protocol user plane of FIG. 3 will be described.

The physical layer as the first layer provides an information transfer service to an upper layer using physical channels. The physical layer is connected to a medium access control (MAC) layer via a transport channel, wherein the MAC layer is located above the physical layer. Data are transferred between the medium access control layer and the physical layer via the transport channel. Moreover, data are transferred between different physical layers, and more particularly, between one physical layer of a transmitting side and the other physical layer of a receiving side via the physical channel. The physical channel is modulated in accordance with an orthogonal frequency division multiplexing (OFDM) scheme, and time and frequency are used as radio resources.

The medium access control (MAC) layer of the second layer provides a service to a radio link control (RLC) layer via a logical channel, wherein the RLC layer is located above the MAC layer. The RLC layer of the second layer supports reliable data transfer. A function of the RLC layer may be implemented as a functional block in the MAC layer. In this case, the RLC layer may not exist. In order to effectively transmit IP packets such as IPv4 or IPv6 within a radio-communication period having a relatively narrow bandwidth, a PDCP layer of the second layer (L2) performs header compression to reduce a header size of the IP packets having unnecessary control information.

A radio resource control (RRC) layer located on the highest part of the third layer is defined in the control plane only and is associated with configuration, reconfiguration and release of radio bearers ('RBs') to be in charge of controlling the logical, transport and physical channels. In this case, the RB means a service provided by the second layer for the data transfer between the user equipment and the UTRAN. If RRC connection is established between the RRC layer of the user equipment and the RRC layer of the E-UTRAN, the user equipment is in an RRC connected (RRC_CONNECTED) state. If not so, the user equipment is in an RRC idle (RRC_IDLE) state.

Examples of downlink transport channels carrying data from the network to the user equipment include a broadcast channel (BCH) carrying system information and a downlink shared channel (SCH) carrying user traffic or control messages. Traffic or control messages of a downlink multicast or broadcast service may be transmitted via the downlink SCH or an additional downlink multicast channel (MCH). Meanwhile, examples of uplink transport channels carrying data from the user equipment to the network include a random access channel (RACH) carrying an initial control message and an uplink shared channel (SCH) carrying user traffic or control message.

Examples of logical channels located above the transport channels and mapped with the transport channels include a broadcast control channel (BCCH), a paging control channel (PCCH), a common control channel (CCCH), a multicast control channel (MCCH), and a multicast traffic channel (MTCH).

The physical channel includes several subframes on a time axis and several subcarriers on a frequency axis. In this case, one subframe includes a plurality of symbols on the time axis. One subframe includes a plurality of resource blocks, each of which includes a plurality of symbols and a plurality of subcarriers. Also, for a physical downlink control channel (PDCCH), that is, L1/L2 control channel, each subfame may use specific subcarriers of specific symbols (for example, the first symbol) of the corresponding subframe. One subframe may include two slots each having a length of 0.5 ms, wherein the two slots may correspond to 1 ms corresponding to a transmission time interval (TTI) which is a transmission unit time of data.

Next, system information will be described. The system information includes essential information that should be known by the user equipment to access the base station. Accordingly, the user equipment should receive all kinds of system information before accessing the base station, and should always have the latest system information. Since the system information should be known by all the user equipments in one cell, the base station periodically transmits the system information.

The system information is classified into a mater information block (MIB), a scheduling block (SB), and a system information block (SIB). The MIB notifies the user equipment of physical configuration (for example, bandwidth) in respect of a corresponding cell. The SB notifies the user equipment of transport information (for example, transport period) of the SIBs. The SIB is a set of associated system information. For example, one SIB includes only information of a peripheral cell, and another SIB includes only information of an uplink radio channel used by the user equipment.

In the meantime, services provided from the network to the user equipment may be classified into three types of services. The user equipment recognizes the types of the cells differently depending on which service is provided thereto. Hereinafter, service types will first be described and then types of the cells will be described.

1) Limited service: this service provides emergency call and ETWS (Earthquake and Tsunami Warning System) and may be provided by an acceptable cell.

2) Normal service: this service means a service of public use and may be provided by a suitable cell.

3) Operator service: this service means a service for a communication network provider, and may be used by the communication network provider only and cannot be used by a general user.

In respect of the service types provided by the cells, the types of the cells may be classified as follows.

1) Acceptable cell is the cell that allows the user equipment to receive a limited service. This cell is not barred in view of the corresponding user equipment, and satisfies a reference for cell selection of the user equipment.

2) Suitable cell is the cell that allows the user equipment to receive a normal service. This cell satisfies a condition of the acceptable cell and at the same time satisfies additional conditions. The additional conditions include that this suitable cell should belong to PLMN that may be accessed by the corresponding user equipment, and should be a cell that does not prohibit a tracking area update procedure of the user equipment. If the corresponding cell is a CSG cell, the user equipment should be a cell that allows the user equipment to access the cell as a CSG member.

3) Barred cell is the cell broadcasting that the cell is the barred cell, through the system information.

4) Reserved cell is the cell broadcasting that the cell is the reserved cell, through the system information.

Hereinafter, RRC state of the user equipment and RRC connection method will be described. The RRC state means whether the RRC layer of the user equipment is logically connected with the RRC layer of the E-UTRAN. If the RRC layer of the user equipment is logically connected with the RRC layer of the E-UTRAN, it may be referred to as RRC connected (RRC_CONNECTED) state. If not so, it may be referred to as RRC idle (RRC_IDLE) state. Since the E-UTRAN may identify the presence of the user equipment which is in the RRC connected state, on the basis of cell unit, it may effectively control the user equipment. On the other hand, the E-UTRAN may not identify the user equipment which is in the RRC idle state, on the basis of cell unit. In this case, the user equipment is managed by the core network (CN) on the basis of TA unit which is a local unit greater than the cell unit. In other words, the presence of the user equipment which is in the RRC_IDLE state is identified on the basis of great local unit, and in order that the user equipment which is in the RRC idle state receives a service such as voice or data, the user equipment should be shifted to the RRC connected state.

When the user initially turns on the power of the user equipment, the user equipment searches for a proper cell and then is maintained in the RRC idle state in the corresponding cell. The user equipment maintained in the RRC idle state performs RRC connection establishment with the RRC layer of the E-UTRAN only if the RRC connection is required, and then is shifted to the RRC connected state. In this case, the case where the RRC connection is required may include a case where uplink data transmission is required due to calling attempt of the user or a case where a response message to a paging message transmitted from the E-UTRAN should be transmitted.

A non-access stratum (NAS) layer located above the RRC layer performs functions such as session management and mobility management.

For mobility management of the user equipment, two types of states, an EPS mobility management registered (EMM-REGISTERED) state and an EMM unregistered (EMM-UNREGISTERED) state are defined in the NAS layer. These two states are applied to the user equipment and the MME. The user equipment is initially in the EMM-unregistered state, and performs a registration procedure with the corresponding network through an initial attach procedure to access the network. If the initial attach procedure is successfully performed, the user equipment and the MME are in the EMM registered state.

Also, in order to manage signaling connection between the user equipment and the EPC, two types of states, an EPS connection management (ECM) idle (ECM_IDLE) state and an ECM connected (ECM_CONNECTED) state are defined in the NAS layer. These two states are applied to the user equipment and the MME. If the user equipment of the ECM idle state is RRC connected with the E-UTRAN, the corresponding user equipment is in the ECM connected state. If the MME which is in the ECM idle state is S1 connected with the E-UTRAN, it is in the ECM connected state. When the user equipment is in the ECM idle state, the E-UTRAN does not have context information of the user equipment. Accordingly, the user equipment which is in the ECM idle state performs a user equipment based mobility related procedure such as cell selection or cell reselection without any command from the network. On the other hand, when the user equipment is in the ECM connected state, mobility of the user equipment is managed by the command of the network. If the position of the user equipment is different from that known by the network in the ECM idle state, the user equipment notifies the network of its position through a tracking area (TA) update procedure.

In the meantime, a radio link failure in the 3GPP LTE system will be described.

Figure 4:
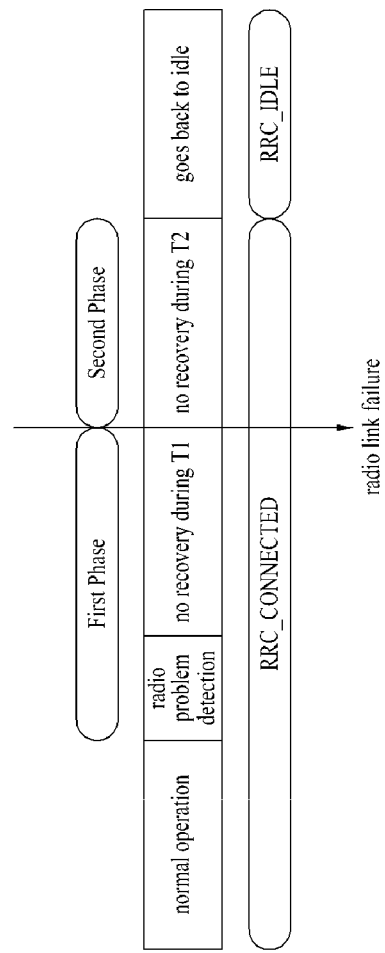
FIG. 4 is a diagram illustrating an operation related to radio link failure.

The user equipment continues to perform measurement to maintain communication link quality with a cell that supports the user equipment. In particular, the user equipment determines whether communication link quality with the cell that currently receives and provides a service from and to the user equipment makes communication impossible. If the user equipment determines that quality of the cell is not good to make communication impossible, it announces radio link failure. If the user equipment announces radio link failure, it quits communication with the cell, and selects another cell through a cell selection procedure and then attempts RRC connection re-establishment. The operation related to radio link failure may be described by two steps as shown in FIG. 4.

At the first step, the user equipment checks whether there is a problem in a current communication link. If there is a problem in the current communication link, the user equipment announces the radio link problem and waits for recovery of the communication link for a certain time period T1. If the corresponding link is recovered for the time period, the user equipment continues to perform the normal operation. If the radio link problem is not recovered for the time period T1 at the first step, the user equipment announces the radio link failure and proceeds to the second step. At the second step, the user equipment performs RRC connection re-establishment procedure for recovery from the radio link failure.

The RRC connection re-establishment procedure is to re-establish RRC connection at the RRC_CONNECTED state. Since the user equipment remains at the RRC_CONNECTED state (that is, since the user equipment does not enter the RRC_IDLE state), it does not reset all of its radio establishments (for example, radio bearer establishments). Instead, the user equipment temporarily suspends use of all the radio bearers except for SRB0 when starting RRC connection re-establishment procedure. If RRC connection re-establishment is successfully performed, the user equipment temporarily resumes use of the radio bearers of which use has been suspended.

Figure 5:
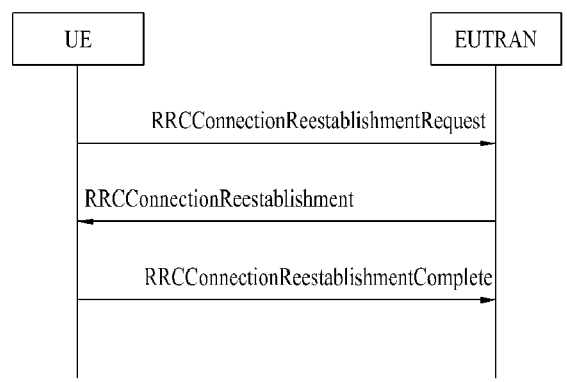
FIG. 5 and FIG. 6 are diagrams illustrating success and failure of RRC connection re-establishment procedure.
Figure 6:
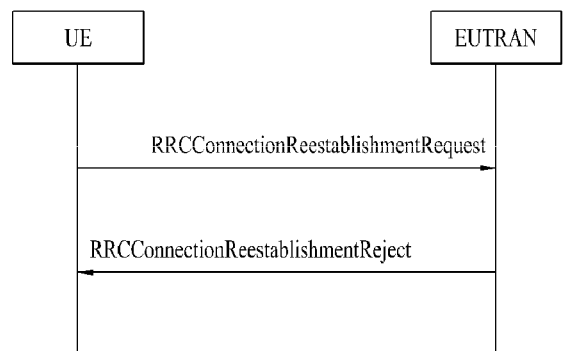

FIG. 5 and FIG. 6 are diagrams illustrating success and failure of RRC connection re-establishment procedure.

The operation of the user equipment during the RRC connection re-establishment procedure will be described with reference to FIG. 5 and FIG. 6. First of all, the user equipment selects one cell by performing cell selection. The user equipment receives system information from the selected cell to receive basis parameters for cell access. Subsequently, the user equipment attempts RRC connection re-establishment through a random access procedure. If the cell selected by the user equipment through cell selection is the cell having context of the user equipment, that is, a prepared cell, the corresponding cell may accept RRC connection re-establishment request of the user equipment, whereby the RRC connection re-establishment procedure may be performed successfully. However, if the cell selected by the user equipment through cell selection is not the prepared cell, since the corresponding cell does not have context of the user equipment, it may not accept RRC connection re-establishment request of the user equipment, whereby the RRC connection re-establishment procedure is failed.

Hereinafter, a machine type communication (MTC) equipment to which the present invention may be applied will be described.

The MTC means that communication is performed between machines without manipulation of a user. A user equipment used for the MTC is the MTC equipment.

Services provided through the MTC equipment are different from the existing communication services dependent upon manipulation of a user and may be applied to various categories.

For example, services such as tracking, metering, payment, medical services, and remote control may be provided by the MTC equipment. The MTC equipment may perform communication with another MTC equipment or MTC server through a mobile communication network.

To provide efficient MTC services, features of the MTC equipment, such as mobility, time tolerant and efficient data communication, should be considered.

Figure 7:
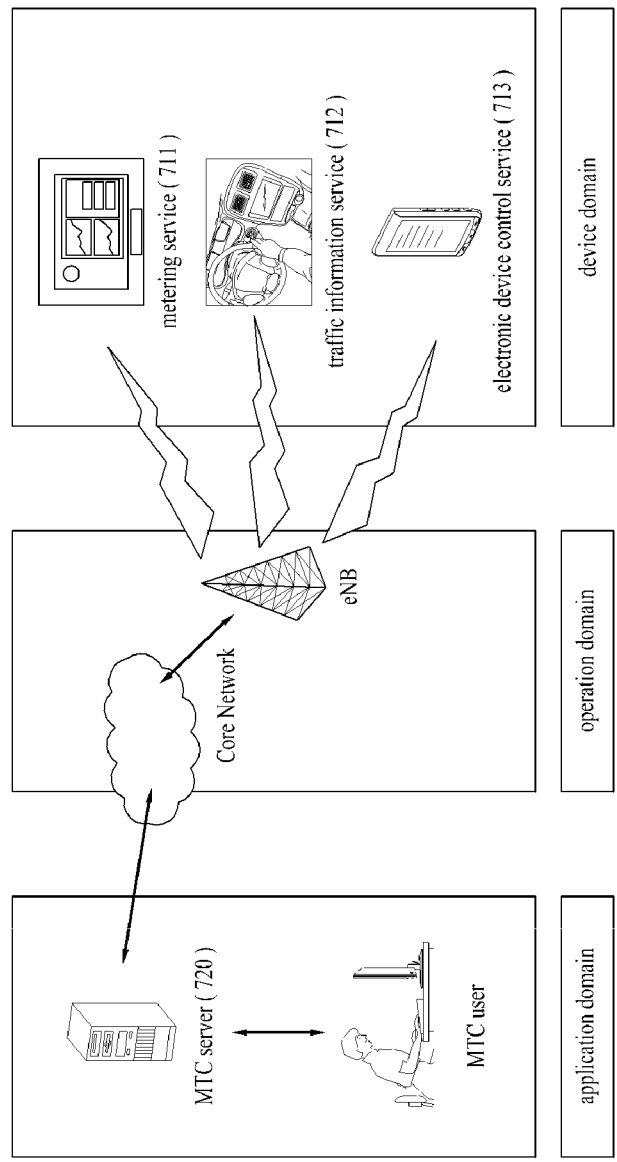
FIG. 7 is a diagram illustrating an example of a structure and a communication procedure of MTC equipment that may be applied to the present invention.

FIG. 7 is a diagram illustrating an example of a structure and a communication procedure of MTC equipment that may be applied to the present invention.

As shown in FIG. 7, if a metering service 711, a traffic information service 712, and user electronic device control service 713, which are provided through the MTC equipment, is received, the base station may transmit these services to the MTC server 720, whereby the MTC user may use the provided services.

Meanwhile, as described above, a plurality of MTC equipment as well as a single MTC equipment may be used. A plurality of MTC equipments may exist in one cell. If the plurality of MTC equipments exist in one cell and attempts connection with the base station at the same time, load occurs in the radio interval, whereby communication of the respective MTC equipments may be interrupted.

Also, a user equipment of a user who has previously established connection with a cell may collide with the plurality of MTC equipments for the radio interval, whereby data communication of the user equipment may be interrupted.

To solve the above problem, the present invention suggests a method for preventing load from occurring in a radio interval by connecting MTC equipment with a base station for an allowed time period through a message that includes allowed time period information to allow the MTC equipment to establish RRC connection in the base station.

The suggested method may be used because the MTC equipment does not need to report a result of a corresponding service in real time through radio communication.

For example, even though the user equipment reports a result of MTC metering service, which measures usage rate of electricity, etc., to the base station for a short allowed time period of the user equipment without reporting the result to the network in real time, no problem occurs, whereby the suggested method may be used.

At this time, the allowed time period may be the early hours of the morning, when the user equipment does not attempt access frequently, and may be determined depending on the status in the cell considering traffic, etc. And, the allowed time period may include a start time period, a sustain time period, or an end time period. However, this is only exemplary, and the allowed time period may be determined considering various factors.

Also, the most suitable allowed time period given to the MTC equipment may be varied depending on the status in the cell considering traffic.

If the plurality of MTC equipments perform communication by using the initially established allowed time period only without considering the varied factors in the cell, it is not efficient. Accordingly, the present invention provides a method for performing communication by allowing MTC equipment to acquire next allowed time period, which may later establish connection with a base station, for an initial allowed time period for initial connection with the base station.

Hereinafter, for convenience of description, the allowed time period initially received by the MTC equipment from the base station will be referred to as the first allowed time period, and the allowed time period that may later be accessed by the MTC equipment will be referred to as the second allowed time period.

Also, although the terminology, base station or network may be used as a target for connection of the MTC equipment, the base station will be used in this specification, for conciseness of description.

According to one embodiment of the present invention, the MTC equipment receives a message that includes information of the first allowed time period, and establishes connection with the base station if the first allowed time period starts. The MTC equipment additionally receives a message that includes information of the second allowed time period from the base station, releases connection with the base station if the first allowed time period ends, and maintains the released connection state to reach the start point of the second allowed time period.

If the second allowed time period starts, the MTC equipment re-establishes connection with the base station and performs communication, and receives information related to a new allowed time period from the base station through a message.

Figure 8:
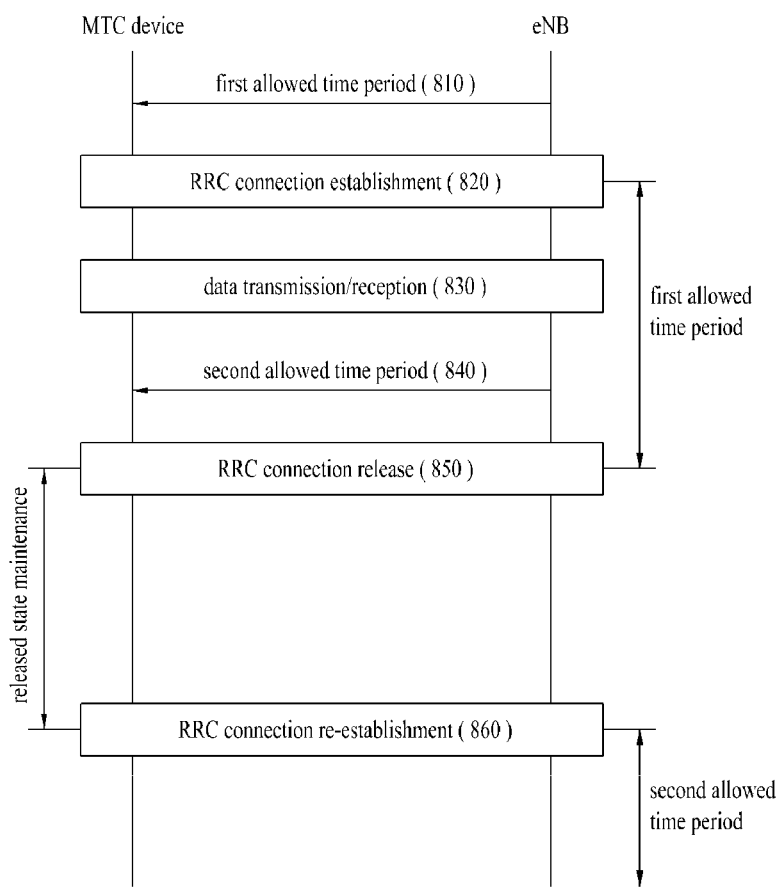
FIG. 8 is a diagram illustrating an example of connection establishment with a base station by acquiring information of initial allowed time period and information of next allowed time period in accordance with one embodiment of the present invention.

FIG. 8 is a diagram illustrating an example of connection establishment with a base station by acquiring information of initial allowed time period and information of next allowed time period in accordance with one embodiment of the present invention.

First of all, the MTC equipment may receive a message, which includes a first allowed time period, from the base station (810). At this time, the message, which includes the first allowed time period, may be included in a paging message or a message of system information, and its details will be described later.

The message, which includes the first allowed time period, may be RRC connection release message. In other words, if RRC connection has been already established between the MTC equipment and the network, RRC connection release message for releasing the established RRC connection may be transmitted from the network together with the message that includes the first allowed time period.

If the message that includes the first allowed time period is received, the MTC equipment is on standby without establishing RRC connection with the base station until the start point of the first allowed time period.

Afterwards, if the first allowed time period starts, the MTC equipment establishes RRC connection with the base station (820). The MTC equipment connected with the base station may perform radio communication by transmitting and receiving data related to various services (830).

If RRC connection with base station is established, the MTC equipment may receive the message, which includes the second allowed time period which is next access allowed time period, from the base station (840).

After receiving the message, which includes the second allowed time period, if the first allowed time period ends, the MTC equipment releases connection with the base station (850).

If connection with the base station is released, the MTC equipment maintains the released connection state until the start point of the second allowed time period without performing operations such as transmission and/or reception of data, RRC connection with the base station, reception of system information, and reception of the paging message.

Afterwards, if the second allowed time period starts, the MTC equipment may establish RRC re-connection with the base station (860), and may perform communication of various data.

Although not shown, the MTC equipment receives a message, which includes next allowed time period for allowing connection establishment of the MTC equipment later, even for the second allowed time period, releases connection with the base station if the second allowed time period ends, and maintains the released connection state until the start point of the next allowed time period.

Accordingly, as the MTC equipment is connected with the base station for the allowed connection time period only to perform communication, load, which may occur for the radio interval, may be minimized and at the same time the changed allowed time period may be applied depending on the status in a cell considering traffic, whereby efficient communication may be performed.

Also, according to one embodiment of the present invention, in a state that the MTC equipment is RRC connected with the base station before receiving the message that includes the first allowed time period, if it receives the message, which includes the first allowed time period, it may release connection with the base station and maintain the released connection state until the start point of the first allowed time period.

Figure 9:
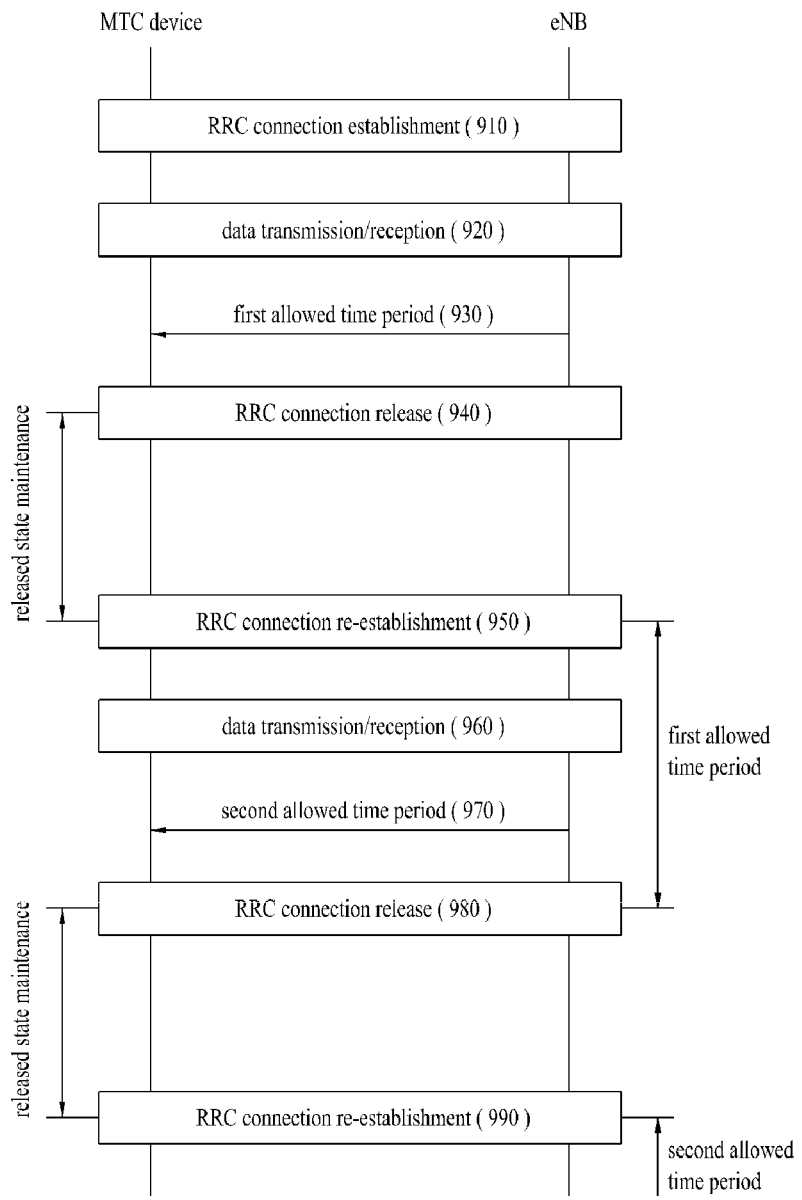
FIG. 9 is a diagram illustrating an example of connection establishment with a base station before receiving information of initial allowed time period in accordance with one embodiment of the present invention.

FIG. 9 is a diagram illustrating an example of connection establishment with a base station before receiving information of initial allowed time period in accordance with one embodiment of the present invention.

Unlike FIG. 8, in FIG. 9, it is assumed that the MTC equipment receives the first allowed time period in a state that it is RRC connected with the base station.

The MTC equipment RRC connected with the base station may perform radio communication by transmitting and receiving data related to various services (910, 920).

At this time, the MTC equipment may receive the message, which includes the first allowed time period, from the base station (930).

The MTC equipment that has received the message, which includes the first allowed time period, releases RRC connection with the base station.

However, if the timing point that has received the message is included in the first allowed time period, the MTC equipment will maintain connection with the base station until the end time of the first allowed time period without releasing RRC connection.

If connection with the base station is released, the MTC equipment maintains the released connection state until the start point of the first allowed time period without performing operations such as transmission and/or reception of data, RRC connection with the base station, reception of system information, and reception of the paging message.

Afterwards, if the first allowed time period starts, the MTC equipment performs communication by re-establishing RRC connection with the base station (950).

Since each of the steps 960 to 990 after re-establishment of RRC connection is similar to each of the steps 830 to 860 of FIG. 8, its description will be omitted for conciseness of the specification.

Accordingly, if the MTC equipment is previously connected with the base station before receiving information of the initial allowed time period, the previously established connection is released and connection is established for the first allowed time period only to perform communication, whereby collision for the radio interval may be minimized.

However, although it has been described assuming that RRC connection is established between the MTC equipment and the network and the message, which includes the first allowed time period, is received before RRC connection is released, the present invention is not limited to this assumption.

In more detail, in a state that RRC connection is established, the network may transmit RRC connection release message for releasing RRC connection together with the message, which includes the first allowed time period.

At this time, the MTC equipment may release RRC connection by receiving the RRC connection release message and maintain the released connection state until the start point of the first allowed time period.

Hereinafter, a method for receiving the message, which includes the first allowed time period and the second allowed time period, in MTC equipment from a base station will be described.

A more detailed method of the method for receiving the message, which includes the first allowed time period and the second allowed time period, in a wireless communication system to which the MTC equipment is applied, will be required. To this end, first of all, a method for receiving information in MTC equipment from a base station will be described.

The method for receiving information in MTC equipment from a base station is divided into a method based on a dedicated signal and a method based on a common signal.

First of all, a method for receiving information through a dedicated signal per MTC equipment will be described. The MTC equipment RRC connected with the base station may receive the message, which includes information, through a dedicated signal allocated to the connected MTC equipment. The dedicated signal may be received through a normal channel or a dedicated channel of each MTC equipment.

At this time, examples of the message that may be received through the dedicated signal may include a message, which includes a new indication of the base station, and a message for releasing RRC connection.

Next, the method for receiving information in MTC equipment from a base station through a common signal will be described. A main example of the method for receiving information in MTC equipment from a base station through a common signal may include a method for receiving information through a paging message and system information message. This method is only exemplary and a method for receiving information through various types of common signals may be applied to the present invention.

Since the description of the system information has been described in FIG. 2 and FIG. 3, paging and the method for receiving a paging message will be described.

Paging is used to allow the core network to transfer paging information, changed system information or emergency information to the MTC equipment which is in the RRC_IDLE state. Also, paging may be used to notify the MTC equipment which is in the RRC_CONNECTED state of the changed system information.

Since location information on the MTC equipment which is in the RRC_IDLE state is managed by the core network on the basis of tracking area (TA) which is local unit greater than a cell, the MTC equipment does not know the core network of the cell where the MTC equipment is currently located.

For this reason, the core network transfer the paging message to all the base stations included in the TA list, and the base station that has received the paging message broadcasts the corresponding paging message in its cell.

At this time, the base station broadcasts the paging message for paging occasion (hereinafter, abbreviated as PO). The PO is a subframe that provides information on transmission of the paging message, and is calculated based on ID of the user equipment.

The user equipment which is in the RRC_IDLE state calculates PO on the basis of its ID and reads out the corresponding subframe. If the paging message is received on the basis of the information on reception of the paging message transferred through the corresponding subframe, the user equipment determines whether its ID is included in the message.

If the ID of the user equipment is included in the received message, the MTC equipment may establish RRC connection with the base station in the same manner as information included in the message or receive the system information.

If the ID of the user equipment is not included in the received message, the MTC equipment disuses the corresponding paging message.

Hereinafter, the method for receiving the message, which includes the first allowed time period and the second allowed time period, in MTC equipment through the aforementioned method for receiving information will be described.

FIG. 10 is a diagram illustrating a method for transmitting a message including information of allowed time period to MTC equipment in accordance with one embodiment of the present invention.

Figure 10A:
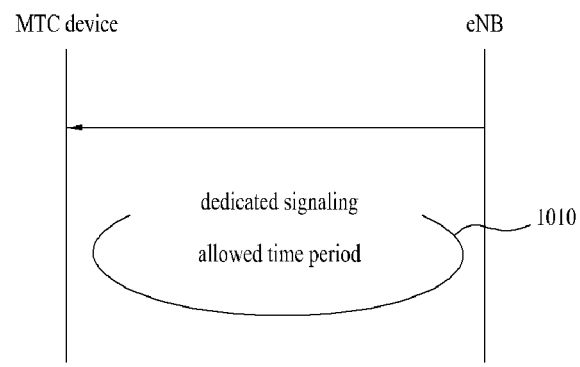
FIG. 10 is a diagram illustrating a method for transmitting a message including information of allowed time period to MTC equipment in accordance with one embodiment of the present invention.

Referring to FIG. 10*a*, the message, which includes information of allowed time period, may be transmitted to the MTC equipment through a dedicated signal 1010 of the MTC equipment RRC connected with the base station.

In other words, if the base station intends to transmit a message, which includes information for new indication, to the MTC equipment through a dedicated signal, it may notify the MTC equipment of the allowed time period for connection with the base station by including the information of the allowed time period in the message.

Figure 10B:
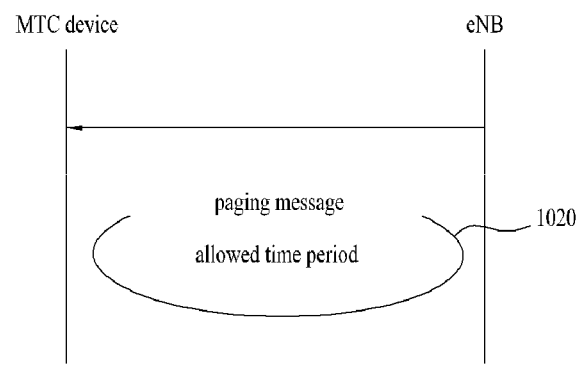

As shown in FIG. 10*b*, the information of the allowed time period may be included in the paging message 1020 for transferring paging information, changed system information or emergency information and then may be transmitted to the MTC equipment.

As described above, if the core network transmits the paging message to all the base stations included in the TA list, the base station that has received the paging message transmits the paging message to the MTC equipment included in its cell.

Since the paging message may be transmitted frequently and broadly, if the information of the allowed time period is included in the paging message, it may efficiently be transmitted to a plurality of MTC equipments (which will be described later in another embodiment).

Figure 10C:
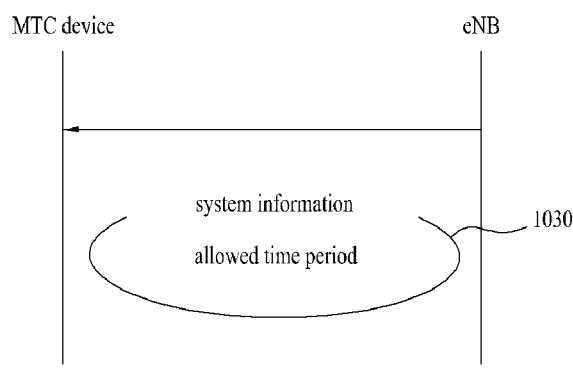

Also, as shown in FIG. 10*c*, the allowed time period may be included in the system information described in FIG. 2 and FIG. 3, whereby the MTC equipment may receive the information of the allowed time period. Since the system information 1030 is the essential information that should be known by the MTC equipment to access the base station, if the information of the allowed time period is included in the system information, it is possible to certainly transfer the information of the allowed time period to the MTC equipment.

Meanwhile, according to another embodiment of the present invention, the allowed time period may be applied to the MTC equipment separately or in a group unit.

The basis for dividing a plurality of MTC equipments in a group unit may be determined considering properties such as function performed by each MTC equipment, used application program, and installed zone. However, the basis is only exemplary and various bases may be made.

In order to apply the allowed time period on the basis of group, the present invention provides a method for dividing a plurality of MTC equipments into groups in accordance with a predetermined basis and transmitting group ID indicating one of the divided groups to the plurality of MTC equipments by including the group ID in a message that includes the allowed time period.

Figure 11:
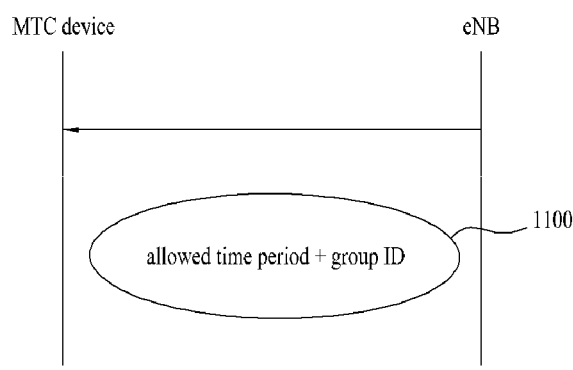
FIG. 11 is a diagram illustrating an example of communication management of a plurality of MTC equipments through a message including group ID in accordance with one embodiment of the present invention.

FIG. 11 is a diagram illustrating an example of communication management of a plurality of MTC equipments through a message including group ID in accordance with one embodiment of the present invention.

As shown in FIG. 11, the MTC equipment that has received the message the allowed time period and group ID from the base station performs communication with the base station by applying the allowed time period included in the message if group ID to which the MTC equipment belongs is included in the received message.

If the MTC equipment determines that group ID to which the MTC equipment belongs is not included in the received message, the MTC equipment disuses the received message.

At this time, the message, which includes group ID, the first allowed time period and the second allowed time period, may be included in the paging message described in FIG. 10 and then transmitted to the plurality of MTC equipments, or may be included in the system information of the base station.

Accordingly, since the MTC equipments having common properties may be managed in group, efficient communication may be performed.

Hereinafter, MTC equipment and base station for performing mechanism that establishes connection with the base station for the first allowed time period and the second allowed time period in accordance with another aspect of the present invention will be described.

Figure 12:
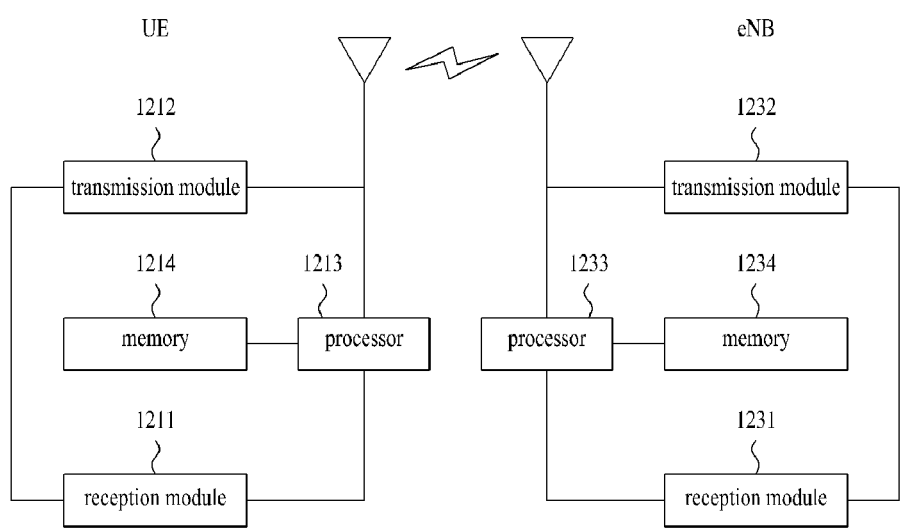
FIG. 12 is a diagram illustrating an example of a wireless communication system that includes a user equipment and a base station according to the present invention.

FIG. 12 is a diagram illustrating an example of a wireless communication system that includes a user equipment and a base station according to the present invention.

Referring to FIG. 12, the MTC equipment may include a reception module 1211, a transmission module 1212, a processor 1213, and a memory 1214. The reception module 1211 may receive various signals, data, information, etc. from the base station. The transmission module 121 may transmit various signals, data, information, etc. to the base station. Also, the reception module 1211 may receive establishment information related to the aforementioned allowed time period from the network. The processor 1213 may control the communication operation with the base station through the establishment information received through the reception module 1111.

In more detail, the processor 1213 establishes connection with the base station if the first allowed time period included in the message received through the reception module starts, releases connection with the base station if the reception module further receives the message, which includes information of the second allowed time period, and the first allowed time period ends, and maintains the released connection state until the start point of the second allowed time period.

Meanwhile, the base station eNB may include a reception module 1231, a transmission module 1232, a processor 1233 and a memory 1234. The reception module 1231 may receive various signals, data, information, etc. from the MTC equipment. The transmission module 1232 may transmit various signals, data, information, etc. to the MTC equipment.

The processor 1233 may control the transmission module 1232 to transmit the message, which includes the first allowed time period and the second allowed time period, to the MTC equipment, and may manage mobility of the corresponding MTC equipment through the message received by the reception module 1231 from the MTC equipment. Also, the processor 1233 performs operation process of information received by the MTC equipment and information to be transmitted to the outside, and the memory 1234 may store the operation processed information for a predetermined time and may be replaced with a buffer (not shown).

Meanwhile, a configuration of the processor which is a core of the modules of the aforementioned MTC equipment and the base station will be described in more detail.

Figure 13:
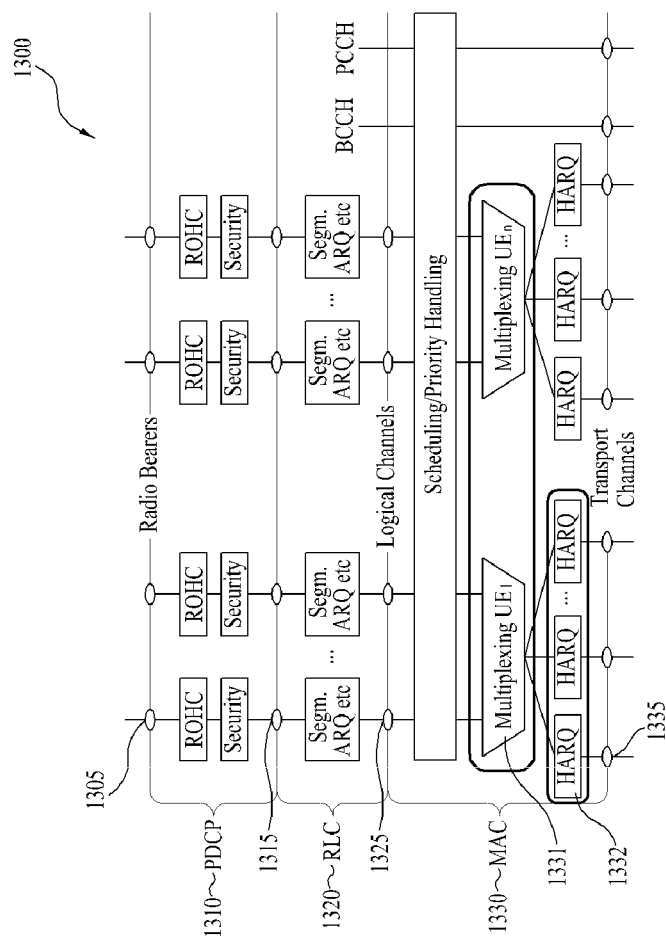
FIG. 13 is a diagram illustrating a function of a processor of a base station, especially a structure of L2 (second layer), to which the embodiments of the present invention are applied.
Figure 14:
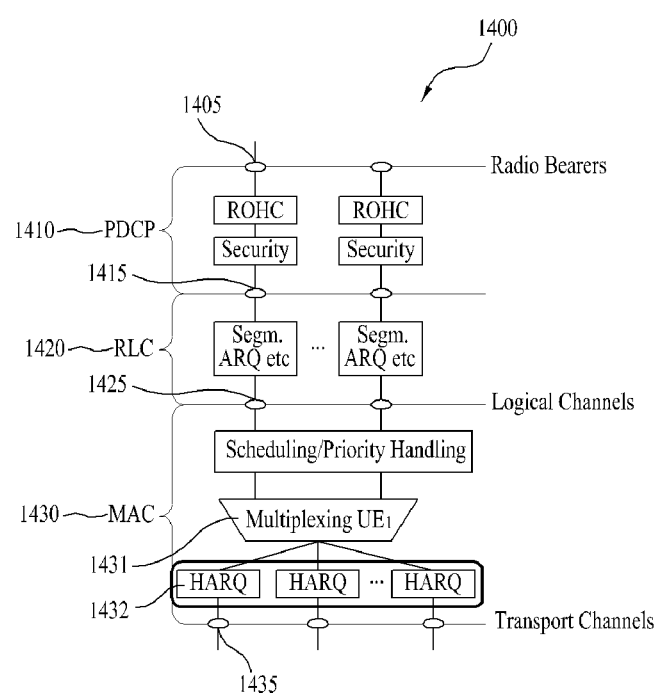
FIG. 14 is a diagram illustrating a function of a processor of a user equipment, specially a structure of L2 (second layer), to which the embodiments of the present invention are applied.

FIG. 13 is a diagram illustrating a function of a processor of a base station, especially a structure of L2 (second layer), to which the embodiments of the present invention are applied, and FIG. 14 is a diagram illustrating a function of a processor of a user equipment, specially a structure of L2 (second layer), to which the embodiments of the present invention are applied.

In a downlink L2 1300 structure of FIG. 13, a PDCP layer 1310, an RLC layer 1320 and a MAC layer 1330 are shown. In FIG. 13, elements 1305, 1315, 1325 and 1335 marked with circles at interfaces between the respective layers represent service access points (SAP) for peer-to-peer communication. The SAP between a PHY channel (not shown) and the MAC layer provides a transport channel (1335), and the SAP between the MAC layer and the RLC layer provides a logical channel (1325). A normal operation of each layer is the same as aforementioned.

The MAC layer multiplexes a plurality of logical channels (that is, radio bearers) from the RLC layer. In the downlink L2 structure, a plurality of multiplexing entities 531 of the MAC layer are related to application of the multiple input multiple output (MIMO) technology. In a system that does not consider the carrier aggregation technology, since a plurality of logical channels are multiplexed in case of non-MIMO to generate one transport channel, one hybrid automatic repeat and request (HARQ) entity is provided to one multiplexing entity 1331 (not shown). Each HARQ entity 1332 processes a transport block independently.

In an uplink L2 structure 1400 of FIG. 14, that is, processor L2 structure of the MTC equipment, the same operation as that of the downlink L2 structure 1300 of FIG. 13 is performed except that one multiplexing entity 1430 is included in one MAC layer 1430.

In other words, a plurality of HARQ entities 1432 are provided, operations related to a plurality of HARQ entities 1432 are performed at the MAC layer 1430, and a plurality of transport blocks may be transmitted and received at the same time.

The embodiments according to the present invention may be implemented by various means, for example, hardware, firmware, software, or their combination.

If the embodiment according to the present invention is implemented by hardware, the embodiment of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

It will be apparent to those skilled in the art that the present invention may be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

INDUSTRIAL APPLICABILITY

Although the aforementioned embodiments of the present invention have been described based on the 3GPP LTE based mobile communication system, they may be applied to various mobile communication systems.

The invention claimed is:

1. A communication method for a machine type communication (MTC) equipment in a wireless mobile communication system, the communication method comprising:
   receiving a first message, including information on a first allowed time period, from a network through dedicated signaling;
   transmitting data to or receiving data from the network during the first allowed time period included in the first message;
   receiving, from the network, a second message including information on a second allowed time period different from the first allowed time period;
   if the first message is received before a start point of the first allowed time period and the MTC equipment is previously connected with the network before receiving the first message:
      releasing connection with the network; and
      maintaining a released connection state until the start point of the first allowed time period; and
   if the first message is received during the first allowed time period, maintaining connection with the base station, without releasing a radio resource control (RRC) connection, until an end point of the first allowed time period.

2. The method according to claim 1, further comprising:
   releasing connection with the network if the first allowed time period ends; and
   maintaining the released connection state until a start point of the second allowed time period.

3. The method according to claim 1, wherein the first message is an RRC connection release message.

4. The method according to claim 1, wherein the second message is received through a dedicated signal.

5. The method according to claim 4, wherein the dedicated signal is received through a dedicated channel.

6. The method according to claim 1, wherein the second message is received through a common signal.

7. The method according to claim 6, wherein the second message is a paging message.

8. The method according to claim 7, wherein the paging message further includes a group ID.

9. The method according to claim 6, wherein the second message is the message by which system information is transmitted.

10. The method according to claim 9, wherein the message by which system information is transmitted further includes a group ID.

11. A communication method of a network in a wireless mobile communication system, the communication method comprising:
    transmitting a first message, including information on a first allowed time period, to at least one a machine type communication (MTC) equipment through dedicated signaling;
    transmitting, to the at least one MTC equipment, a second message including information on a second allowed time period different from the first allowed time period;
    if the first message is received before a start point of the first allowed time period and the MTC equipment is previously connected with the network before receiving the first message:
       releasing connection with the network; and
       maintaining a released connection state until the start point of the first allowed time period; and
    if the first message is received during the first allowed time period, maintaining connection with the base station, without releasing a radio resource control (RRC) connection, until an end point of the first allowed time period.

12. The method according to claim 11, wherein the first message and the second message are used to:
    allow the at least one MTC equipment to release connection with the network if the first allowed time period ends; and
    maintain the released connection state until a start point of the second allowed time period.

13. The method according to claim 11, wherein the first message is an RRC connection release message.

14. The method according to claim 11, wherein the second message is received through a dedicated signal.

15. The method according to claim 14, wherein the dedicated signal is received through a dedicated channel.

16. The method according to claim 11, wherein the second message is received through a common signal.

17. The method according to claim 16, wherein the second message is a paging message.

18. The method according to claim 17, wherein the paging message further includes a group ID.

19. The method according to claim 16, wherein the second message is the message by which system information is transmitted.

20. The method according to claim 19, wherein the message by which system information is transmitted further includes a group ID.

* * * * *